E4822 OR AI 070 [redacted] [redacted]
[redacted]
3 Sheets—Sheet 1.
J. H. TIMS.
Car Axle Box.
No. 70.
A. I. Patented July 1, 1844.
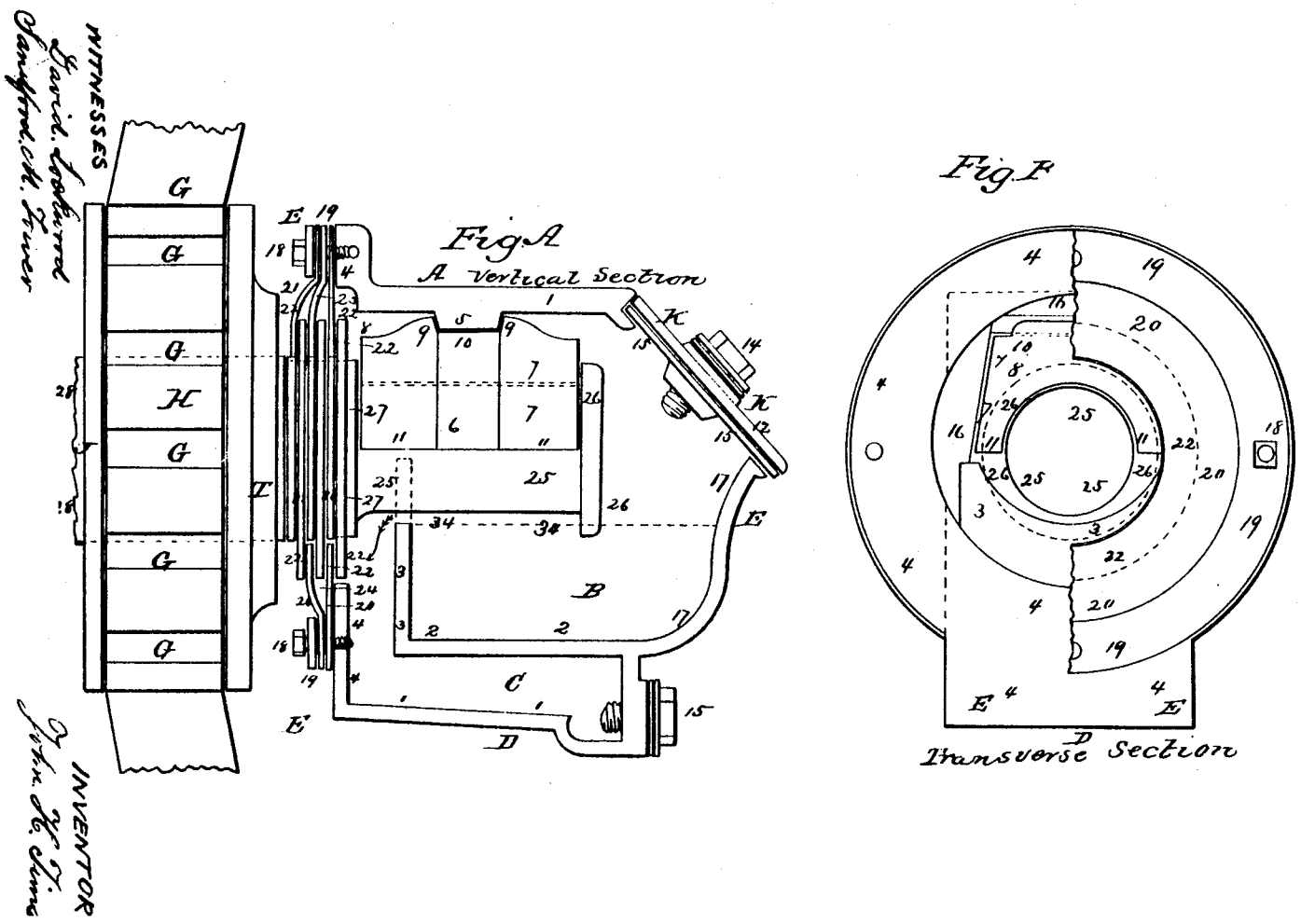
N. PETERS, Photo-Lithographer, Washington, D.C.

83
3 Sheets—Sheet 2.
J. H. TIMS.
Car Axle Box.
No. 70.
A. I. Patented July 1, 1844.
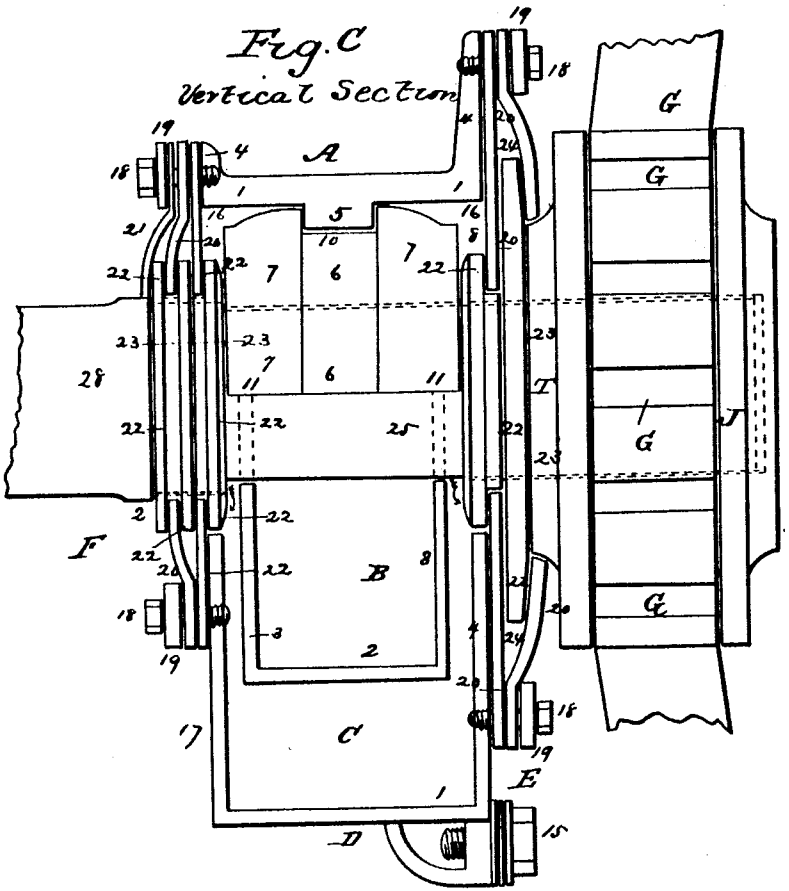
WITNESSES
David Lockwood
Sandford M. Towe
INVENTOR
John H. Tims
N. PETERS, Photo-Lithographer, Washington, D.C.

3 Sheets—Sheet 3.
J. H. TIMS.
Car Axle Box.
No. 70.
A. I. Patented July 1, 1844.
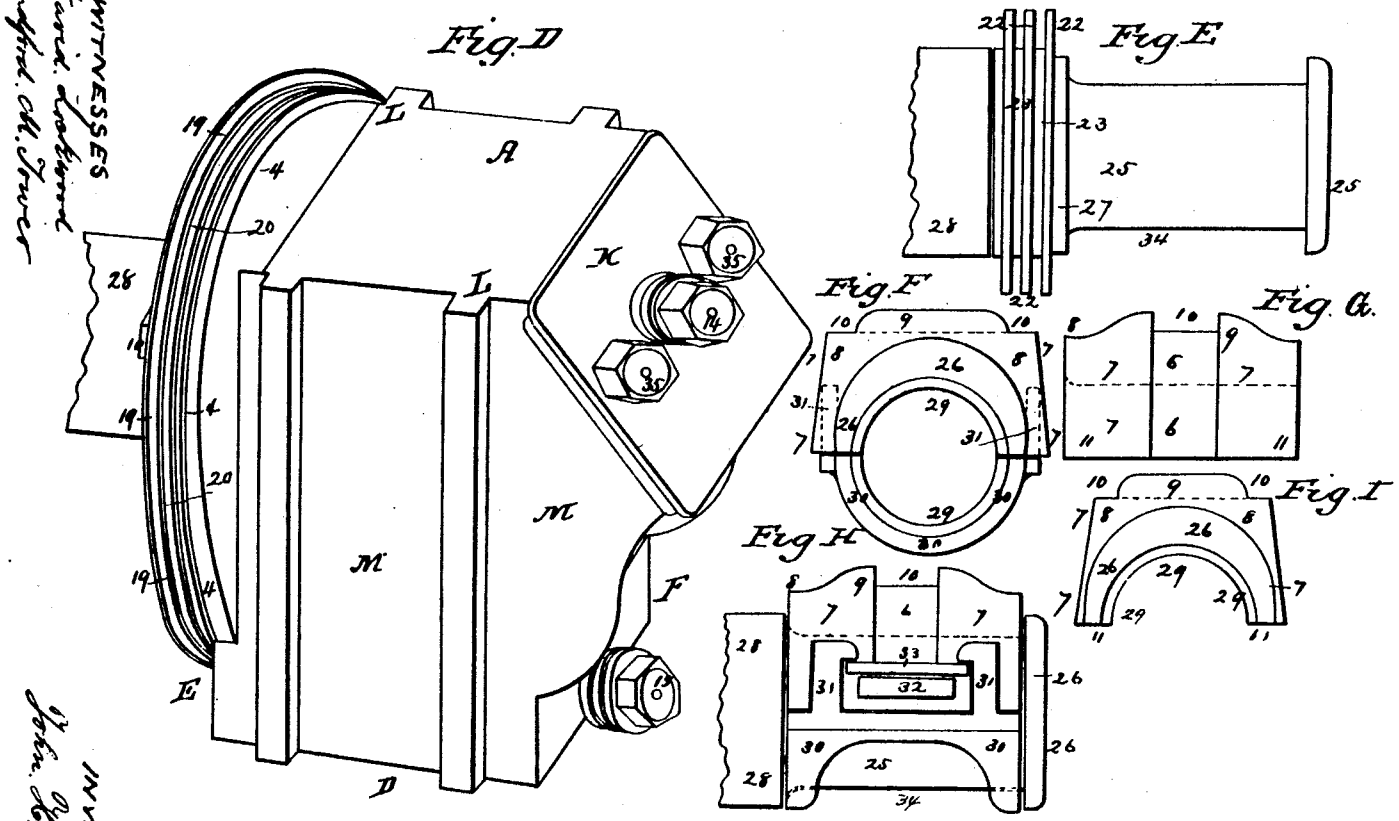
WITNESSES
David Lockwood
Sandford M. Tower
INVENTOR
John H. Tims.